United States Patent
Neill et al.

(10) Patent No.: US 9,819,984 B1
(45) Date of Patent: Nov. 14, 2017

(54) DIGITAL VIDEO RECORDING WITH REMOTE STORAGE

(71) Applicant: CSC Holdings, LLC, Bethpage, NY (US)

(72) Inventors: Richard W. Neill, Syosset, NY (US); Stephanie Mitchko, Smithtown, NY (US); Peter Caramanica, Westbury, CT (US)

(73) Assignee: CSC Holdings, LLC, Bethpage, NY (US)

( * ) Notice: Subject to any disclaimer, the term of this patent is extended or adjusted under 35 U.S.C. 154(b) by 0 days.

(21) Appl. No.: 14/550,566

(22) Filed: Nov. 21, 2014

Related U.S. Application Data (63) Continuation of application No. 12/055,795, filed on Mar. 26, 2008.

(60) Provisional application No. 60/920,059, filed on Mar. 26, 2007.

(51) Int. Cl.
| | |
|---|---|
| *H04N 21/2183* | (2011.01) |
| *H04N 21/2747* | (2011.01) |
| *H04N 21/234* | (2011.01) |
| *H04N 21/258* | (2011.01) |
| *H04N 21/231* | (2011.01) |
| *H04N 21/6587* | (2011.01) |
| *H04N 21/61* | (2011.01) |

(52) U.S. Cl.
CPC ... *H04N 21/2747* (2013.01); *H04N 21/23109* (2013.01); *H04N 21/23113* (2013.01); *H04N 21/23406* (2013.01); *H04N 21/25816* (2013.01); *H04N 21/25875* (2013.01); *H04N 21/6118* (2013.01); *H04N 21/6587* (2013.01)

(58) Field of Classification Search
CPC ....... H04N 21/21815; H04N 21/25816; H04N 21/274; H04N 21/2743; H04N 21/6587; H04N 21/2183; H04N 21/222; H04N 21/23406; H04N 21/2747; H04N 21/6118
See application file for complete search history.

(56) References Cited

U.S. PATENT DOCUMENTS

| | | | |
|---|---|---|---|
| 5,440,334 A | * | 8/1995 | Walters et al. .............. 725/92 |
| 5,550,577 A | | 8/1996 | Verbiest et al. |
| 5,568,181 A | | 10/1996 | Greenwood et al. |
| 5,720,037 A | | 2/1998 | Biliris et al. |
| 5,721,829 A | | 2/1998 | Dunn et al. |
| 6,002,720 A | | 12/1999 | Yurt et al. |

(Continued)

FOREIGN PATENT DOCUMENTS

| | | |
|---|---|---|
| EP | 0757487 A1 | 2/1997 |

OTHER PUBLICATIONS

"Adelphia Extends Partnership with Gotuit Media to Enhance on Demand Programming with Personalized Viewing" downloaded from http://www.atlasventure.com/newsandevents/news.cfm?id=308&p=1 dated Feb. 7, 2007 (2 pages).

AT&T Homezone Article downloaded from <http://www.backchannelmedia.com/newsletter/articles/4881/ATampT-Moving-into-Cable-T> dated Feb. 7, 2007 (3 pages).

Czyrnek et al., "Large-scale multimedia content delivery over optical networks for interactive TV services" from Future Generation Computer Systems 22 (2006) pp. 1018-1024.

(Continued)

*Primary Examiner* — Hai V Tran
(74) *Attorney, Agent, or Firm* — Sterne, Kessler, Goldstein & Fox PLLC (57) ABSTRACT

Centralized storage and playback of user-recorded television programming eliminates the need for expensive DVR devices to be deployed in the field. Further, the methods used to initiate storage and provide playback of stored media respect copyright principles.

35 Claims, 6 Drawing Sheets

(56) References Cited

U.S. PATENT DOCUMENTS

| | | | |
|---|---|---|---|
| 6,182,128 B1 | 1/2001 | Kelkar et al. | |
| 6,233,389 B1 | 5/2001 | Barton et al. | |
| 6,801,947 B1* | 10/2004 | Li | 709/231 |
| 6,985,932 B1 | 1/2006 | Glaser et al. | |
| 7,080,400 B1 | 7/2006 | Navar | |
| 7,624,412 B2* | 11/2009 | McEvilly et al. | 725/46 |
| 8,132,221 B2 | 3/2012 | Malik | |
| 9,571,782 B2 | 2/2017 | Rutledge | |
| 2002/0138844 A1 | 9/2002 | Otenasek et al. | |
| 2003/0044170 A1 | 3/2003 | Haddad et al. | |
| 2003/0070182 A1 | 4/2003 | Pierre et al. | |
| 2003/0097659 A1 | 5/2003 | Goldman | |
| 2003/0149988 A1* | 8/2003 | Ellis et al. | 725/87 |
| 2003/0208765 A1 | 11/2003 | Urdang et al. | |
| 2003/0208767 A1 | 11/2003 | Williamson et al. | |
| 2004/0006698 A1* | 1/2004 | Apfelbaum | 713/182 |
| 2004/0133923 A1 | 7/2004 | Watson et al. | |
| 2004/0187164 A1 | 9/2004 | Kandasamy et al. | |
| 2004/0194146 A1 | 9/2004 | Bates et al. | |
| 2004/0203353 A1 | 10/2004 | Connor | |
| 2004/0250282 A1 | 12/2004 | Bankers et al. | |
| 2004/0255336 A1 | 12/2004 | Logan et al. | |
| 2004/0268386 A1 | 12/2004 | Logan et al. | |
| 2005/0033850 A1 | 2/2005 | Kirkland | |
| 2005/0034171 A1 | 2/2005 | Benya | |
| 2005/0251827 A1* | 11/2005 | Ellis et al. | 725/47 |
| 2006/0020993 A1 | 1/2006 | Hannum et al. | |
| 2006/0080703 A1 | 4/2006 | Compton | |
| 2006/0130116 A1 | 6/2006 | Shi et al. | |
| 2006/0140584 A1 | 6/2006 | Ellis et al. | |
| 2007/0094702 A1 | 4/2007 | Khare et al. | |
| 2007/0245384 A1 | 10/2007 | Walter et al. | |
| 2007/0263980 A1 | 11/2007 | Chen et al. | |
| 2007/0276925 A1 | 11/2007 | La Joie et al. | |
| 2007/0294170 A1 | 12/2007 | Vantalon et al. | |
| 2008/0005770 A1 | 1/2008 | Acharya et al. | |
| 2008/0031590 A1 | 2/2008 | Kulas | |
| 2008/0059645 A1 | 3/2008 | Gregotski et al. | |
| 2008/0134239 A1 | 6/2008 | Knowles et al. | |
| 2008/0134278 A1 | 6/2008 | Al-Karmi | |
| 2008/0140818 A1 | 6/2008 | Du Breuil et al. | |
| 2010/0036963 A1 | 2/2010 | Gahm et al. | |
| 2010/0115567 A1 | 5/2010 | Gupta et al. | |
| 2010/0115568 A1 | 5/2010 | Gupta et al. | |

OTHER PUBLICATIONS

Incentra Solutions, Inc."Front Porch Digital Signs Global Reseller Agreement with Volicon" downloaded from http://www.incentrasolutions.com/print.php./sid/37 /aid/159/pid/211 nid/447/siteype/Incentra dated Feb. 7, 2007 (3 pages).

Mercer, "Keeping up with content, How to successfully manage VOD's bread-and-butter" (pp. 51-54).

Mostefaoui, "A modular and adaptive framework for large scale video indexing and content-based retrieval: the SIRALE system" (20 pages).

Scripps/Amazon Agreement Article downloaded from <http://www.redorbit.com/modules/news/tools.php?tool=print&id=776909> dated Feb. 7, 2007 (2 pages).

Vividon and EMC Agree to Integrate 'Best in Class' On-demand Streaming and Centera Content Addressed Storage (2 pages).

Wang et al. "Optimal Proxy Cache Allocation for Efficient Streaming Media Distribution" from IEEE INFOCOM 2002 (p. 1726-1735).

Non-final Office Action, dated Aug. 29, 2012, for U.S. Appl. No. 13/029,687, filed Feb. 17, 2011, 8 pages.

Final Office Action, dated Feb. 14, 2013, for U.S. Appl. No. 13/029,687, filed Feb. 17, 2011, 11 pages.

Non-final Office Action, dated Aug. 14, 2013, for U.S. Appl. No. 13/029,687, filed Feb. 17, 2011, 11 pages.

Final Office Action, dated Mar. 11, 2014, for U.S. Appl. No. 13/029,687, filed Feb. 17, 2011, 11 pages.

Non-final Office Action, dated Jun. 5, 2014, for U.S. Appl. No. 13/029,687, filed Feb. 17, 2011, 11 pages.

Final Office Action, dated Feb. 11, 2015, for U.S. Appl. No. 13/029,687, filed Feb. 17, 2011, 13 pages.

Non-final Office Action, dated Jun. 29, 2015, for U.S. Appl. No. 13/029,687, filed Feb. 17, 2011, 13 pages.

Final Office Action, dated Nov. 30, 2015, for U.S. Appl. No. 13/029,687, filed Feb. 17, 2011, 13 pages.

Non-final Office Action, dated Apr. 19, 2016, for U.S. Appl. No. 13/029,687, filed Feb. 17, 2011, 13 pages.

U.S. Appl. No. 15/390,036, filed Dec. 23, 2016, entitled "Feature Activation on Occurrence of an Event".

\* cited by examiner

DIGITAL VIDEO RECORDING WITH REMOTE STORAGE

CROSS-REFERENCE TO RELATED APPLICATIONS

This application is a continuation application of U.S. patent application Ser. No. 12/055,795, entitled Digital Video Record With Remote Storage, filed on Mar. 26, 2008, which claims priority to and the benefits of U.S. provisional patent application Ser. No. 60/920,059, filed on Mar. 26, 2007, the entire disclosures of which is incorporated herein by reference.

FIELD OF THE INVENTION

The invention relates generally to facilitating the storage and telecast of media content. More specifically, the invention relates to systems and methods for allowing consumers to direct the storage and playback of the content using a remote server.

BACKGROUND

For decades, television viewers have been able to record programming for later viewing using videotape and, more recently, digital video recording (DVR) technology. This practice of "time-shifting" has long been recognized as permissible even for content subject to copyright.

For the convenience of cable television subscribers, DVR technology has recently become available on set-top boxes (STBs) using recordable mass-storage media (e.g., a hard drive) deployed within the STB. This approach, while consistent with the traditional "client-side" arrangement in which the storage device is co-located with the user's television set, is nonetheless cumbersome and expensive as it requires the distribution of the storage equipment to the subscriber base. While co-location may have been unavoidable in the days before secure, high-bandwidth telecommunications, today—particularly in digital-television environments—timely retrieval no longer requires proximity to the storage device. Accordingly, the location of the stored content is arbitrary.

Challenges facing the cable operators (commonly referred to as Multi-System Operators, or "MSOs") are not purely technical, however. Content owners have reluctantly acknowledged court rulings that established the principle that copies of telecast content made by a consumer for his own viewing is "fair use" of such content. Content owners have, however, attempted to limit the applicability of such rulings, suggesting that copies made and stored using equipment located outside the consumer's home (e.g., on the premises of an MSO) are in fact "made by" the MSO and therefore do not fall within the scope of such holdings. If accurate, the MSO would require additional licenses of the content, which would in turn significantly increase the costs of proving such a service.

A need therefore exists to facilitate content storage at a location that is optimal from a system-wide perspective, while permitting users to record television programming and to play back such recordings in a manner substantially similar to and with functionality commonly associated with conventional client-side recording devices, while operating within the legal constraints of copyright law.

SUMMARY OF THE INVENTION

The present invention facilitates the centralized storage and playback of user-recorded television programming, thus eliminating the need for expensive DVR devices to be deployed in the field. Further, the methods used to initiate storage and provide playback of stored telecasts are designed and implemented to respect copyright principles.

In preferred embodiments, the invention provides users with access to a front-end application (for example, via a display device, such as a television, associated with a standard cable STB, and/or via the World Wide Web) that enables a user to command the recording multimedia content such as television programming in real time (e.g., by pressing a "record" button on a remote control or display), either while such content is being telecast or by scheduling a recording in advance. This recorded content is stored in storage space dedicated to the user on servers at a central facility of the MSO, which may also house much of the software and hardware necessary to operate a cable television distribution system.

In deference to copyright principles, the system may be configured to dedicate server-side storage attributed to particular user without creating copies under the direction of the MSO, resulting in a unique copy of the content under the exclusive control of the user. Such an approach avoids the creation and storage of a copy of the content at the direction or initiative of the MSO. To further foster consistency with copyright principles, the system may be configured to avoid rolling buffers and/or redundant or back-up copies of programs recorded by users. Consequently, if the system malfunctions or if the disk drive on which a user's dedicated storage space is located is damaged, the user loses the affected content.

Therefore, in a first aspect, the invention pertains to a method of storing telecast video content on behalf of multiple users (e.g., cable system subscribers). In various embodiments, the method comprises receiving user-initiated commands to store a copy of the telecast video content, associating a nonvolatile storage with each user such that each storage is under the associated user's exclusive control, and receiving the content from a content provider. The content is stored in a primary buffer, which in turn provides the content to secondary buffers that are created in response to (and correspond to) the user-initiated commands. The content is then transferred from each secondary buffer to the storage associated with the user.

The content may be copied from the primary buffer to the secondary buffers at the packet level, thus allowing any limitations as to the amount of data stored at either buffer to be implemented at the packet level. For example, the primary buffer may be limited to storing no more than a fixed percentage (e.g., 0.05%) or time duration (e.g., 0.1 second) of the video content, limiting the number of packets stored accordingly. In some instances, the buffers may store no packets at all, acting as conduits through which the video content is transmitted. The packets may be permanently deleted from the primary buffer as they are provided to the secondary buffer.

In some embodiments, a copy of application code may be instantiated for (and in some cases licensed to) each user such that upon execution, the application receives commands from that individual user and creates unique commands to store the video content on behalf of such user. In some versions, the unique commands are aggregated into a single command whose execution creates the secondary buffers. The individual copies may be stored in the same storage dedicated to each user, or, in other embodiments, on different storage devices and/or different storage locations.

In another aspect, the invention provides a method for of presenting telecast video content to a user. In various embodiments, the method includes receiving a user-initiated command to store a copy of telecast video content and associating nonvolatile storage with the user such that the partition is under the user's exclusive control. The content is received from a content provider and placed in a primary buffer. A secondary buffer corresponding to the command to store the content is created for receiving data from the primary buffer, and as the content is received it is transferred from the primary buffer to the secondary buffer, and subsequently from the secondary buffer to the storage associated with the user having issued the command. Upon receipt of a command from the user to view the stored content, it is transmitted directly from the storage partition to a display device associated with the user.

The stored content may be transmitted from the storage partition without the creation of a playback buffer. In other embodiments, however, the user may initiate commands to alter playback of the content (e.g., fast forwarding, rewinding or pausing, referred to herein as "trick-play"). In such cases, a trick-play buffer may be used to facilitate the altered playback, and in certain instances the trick-play buffer (or its contents) is deleted once the command is executed.

In another aspect, the invention provides a system for storing telecast video content on behalf of multiple users of the system. The system includes an application module having instructions for rendering a user interface facilitating selection of commands for storing the telecast video content, and nonvolatile storage areas each uniquely associated with (and under the exclusive control of) one of the users. The system also includes a transaction server for responding to received commands for storing telecast video content. The transaction server creates unique commands to store the video content on behalf of each of the users and aggregates the unique commands into a single transaction command. The system further includes a content processing server configured to receive the telecast video content from content providers into a first buffer, and in response to the single transaction command creates secondary buffers from the received telecast. Each secondary buffer is uniquely associated with one of the users, and its contents are transmitted onto a corresponding storage partition.

In some versions, copies of the application module may be made for each of the users, thereby allowing each user to interact with and instruct the system using his own copy of the application.

Other aspects and advantages of the invention will become apparent from the following drawings, detailed description, and claims, all of which illustrate the principles of the invention, by way of example only.

BRIEF DESCRIPTION OF THE DRAWINGS

In the drawings, like reference characters generally refer to the same parts or steps throughout the different views. Also, the drawings are not necessarily to scale, emphasis instead generally being placed upon illustrating the principles of the invention.

DETAILED DESCRIPTION

Figure 1:
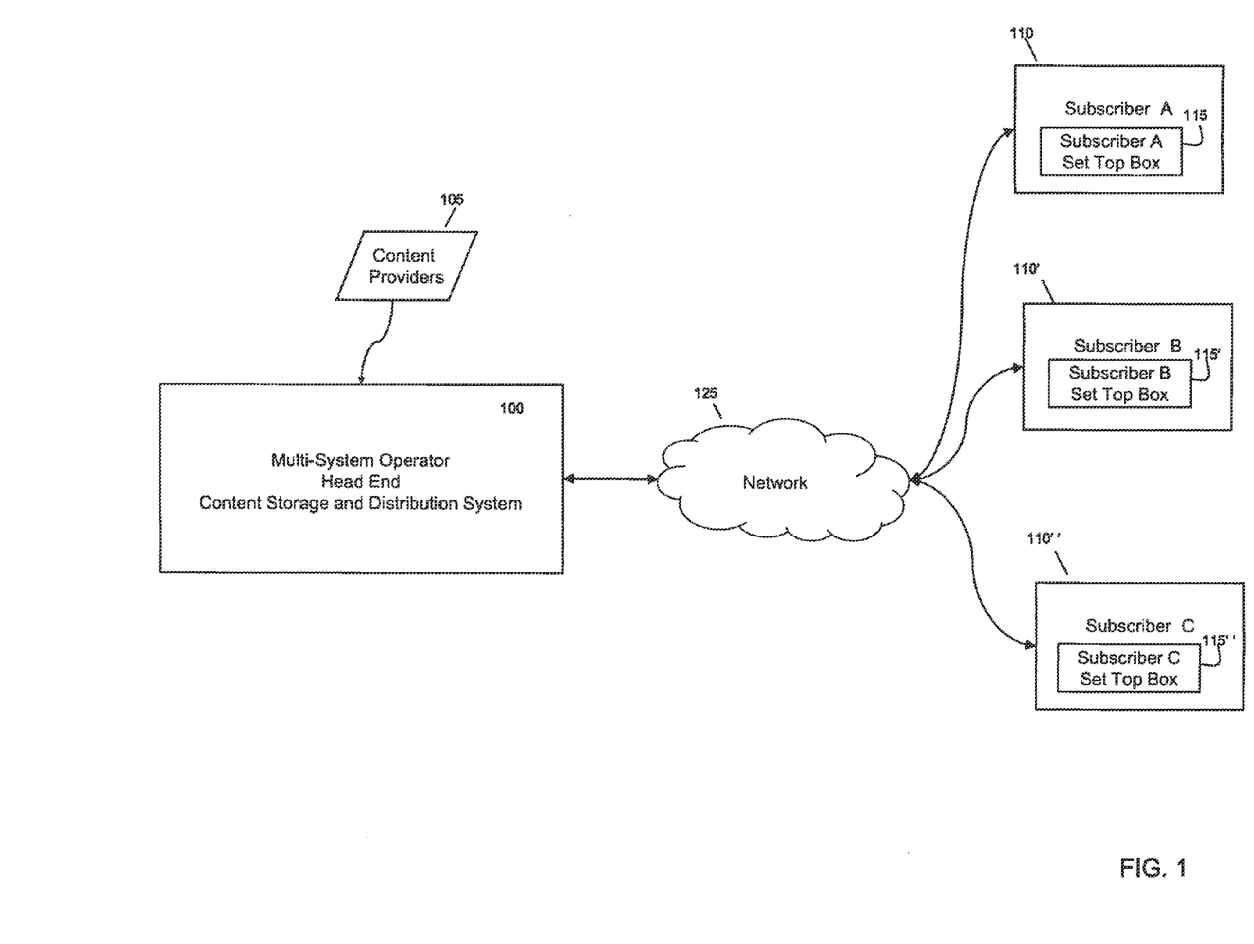
FIG. 1 is a block diagram of an exemplary cable network for delivering media content to and storing media content on behalf of subscribers according to an embodiment of the invention.

FIG. 1 illustrates the general operational environment in which a media content storage and distribution system 100 (the "system") may be implemented in accordance with various embodiments of the invention. Although the system 100 may be owned, operated, leased, or licensed to or from any media entity (e.g., a broadcast or telecast or private network, an Internet service provider, website operator, etc.) for ease of presentation the system 100 will herein be assumed to be owned and operated by a cable television service provider or similar multiple system operator ("MSO"). In such cases, the system 100 is typically located at the "head-end" of the cable network. In large implementations, there may be more than one head-end, each servicing different geographic regions, for example.

Content providers 105 provide media content to the MSO, typically via satellite and in digital form, for subsequent distribution by the MSO. Multiple end-users ("users" or "subscribers") subscribe to the services (channels, broadband Internet access, telephone services, etc.) provided by the MSO, including access to the system 100. As shown, the system 100 services three subscribers 110, 110' and 110", for exemplary purposes, but of course there can be any number of subscribers 110. In some implementations, the system 100 may be provided as part of a standard set of services offered by the MSO, whereas in other cases access and use of the system 100 may be limited to certain subscribers 110, such as those paying additional subscription fees.

To access the system 100, subscribers are issued a set-top-box (STB) 115 (or, in some embodiments a cable card (or similar device) that may be inserted into a television or other display device), typically located at the subscriber's home or business. The STB is used to access the cable network, decode and display the multimedia content of the cable TV channels, and in some cases interact with applications and other services (e.g., video-on-demand, shopping) provided by the MSO. A display unit such as a television or computer (not shown) is coupled to the STB 115, and facilitates the viewing of video programs and multimedia content provided by the MSO. The STB 115 may include an interface that enables the use of a remote control (e.g., an infra-red or radio-frequency transmitter), thereby allowing subscribers 110 to direct the functionality of the STB 115 and cause the transmission of commands from the set-top-box 115 to the head-end.

In other implementations, the STB 115 may be replaced or augmented with a client computer, a television set, or software stored on a cable card, which allows subscribers to view and record digital cable television channels on digital video recorders, personal computers and televisions without the use of a STB. The cable card is similar to a PCMCIA card used to connect laptops to networks. The functionality of the STB may be implemented as software running on a personal computer (e.g., a PC with an INTEL processor or an APPLE MACINTOSH) capable of running such operating systems as the MICROSOFT WINDOWS family of operating systems from Microsoft Corporation of Redmond, Wash., the OSX operating system from Apple Computer of Cupertino, Calif., and various varieties of Unix, such as SUN SOLARIS from SUN MICROSYSTEMS, and GNU/Linux from RED HAT, INC. of Durham, N.C. (and others). The STB functionality may also be implemented on such hardware as a smart or dumb terminal, network computer, wireless device, personal data assistant, MP3 player, wireless telephone, information appliance, workstation, minicomputer, mainframe computer, or other computing device, that is operated as a general purpose computer, or a special purpose hardware device used solely for providing subscribers with access to the system 100.

In various embodiments, the STB 115 communicates with the system 110 over a network 125. The network 125 uses coaxial cable, fiber optics, and/or standard or enhanced telephone lines to transmit content and user commands between and among the head-end and the STBs 115. In some instances in which the STB functionality is provided within or as part of a personal computer, the network 125 man carry TCP/IP protocol communications and HTTP/HTTPS requests made by the set-top-box 115. Other non-limiting examples of networks that can serve as or be part of the communications network 125 include a wireless or wired Ethernet-based intranet, a local or wide-area network (LAN or WAN), and/or the global communications network known as the Internet, which may accommodate many different communications media and protocols.

Generally, the invention facilitates the centralized storage and playback of user-recorded television programming, thus eliminating the need for expensive DVR devices (e.g., enhanced STBs) to be deployed in the field. Subscribers 110 access a front-end application (described in greater detail below and provided, for example, via a display device, such as a television, associated with a standard cable STB, and/or via the web) that enables the subscriber to communicate instructions to equipment located at the MSO to record television programming on his behalf, either while such content is being telecast (i.e., in "real time") or by scheduling a recording in advance. The application provides a menu system which, when displayed on a display device via the STB allows the subscriber 110 to navigate telecast schedules and indicate which programs to record. This recorded content is stored in storage space specifically dedicated to and under the exclusive control the user on servers at the head-end. Using the menu and application, users can select previously recorded programs to watch at any time, and when desired, delete previously recorded content. In some embodiments, the MSO specifically does not create any backup copies of the content, and therefore once a program has been deleted, it is no longer available for playback by the user. Various settings (or metadata) relating to user-selected content, such as duration to retain a particular piece of content, what content to automatically record, etc., can be manipulated by the user.

Depending on the implementation, the system may allow the user to select arbitrary portions of television content for recording (i.e., to start and end recording in response to entered commands), in the manner of a conventional DVR device; in other words, a user can choose to record only a portion of a television program. Unlike conventional methods in which a staging copy is used to create the partial copy, a unique copy of just that portion of the content is created for that user directly from the telecast content in response to the user's commands to do so.

For copyright purposes, the system 100 may be configured to dedicate server-side storage for the exclusive use of a particular user. In such embodiments, each authorized STB (or individual) within a household is assigned a specified amount of dedicated storage space on a server located at the head-end of the cable system. This storage space is preferably all located on the same physical hard drive, which may be shared by multiple (e.g., up to four) users. Through the use of identifiers, each recorded copy of a television program is uniquely associated with the STB through which the record command was sent, and can be retrieved only by that same STB, preventing one user's copies from being accessed by another user. Thus, if 1000 users elect to record a given program, 1000 separate copies of the program are created from the initial streamed telecast of the program, each of which is uniquely associated with the STB through which the corresponding user commanded the program's recording and will be accessible only to that user through his or her STB. If a user's storage space is full, then he will not be able to record any new content unless he deletes a stored program. In some cases, however, a user may mark certain programs to be deleted in the event of such a capacity shortfall or establish rules to address such a shortfall (e.g., a FIFO arrangement whereby the oldest recorded program is deleted as new content is added). Certain embodiments may have default rules (e.g., FIFO) addressing capacity shortfalls unless a user specifically chooses to override them.

To further foster consistency with copyright principles, the system 100, may make a copy of a program only if a user specifically commands it. In such implementations, "rolling buffers" (typically used for temporary recording of a program) are not used, and therefore to record an entire program, a user must initiate a command to do so before the program begins. If, for example, a user presses the "record" button after a program begins, only that portion of the program telecast after the user issued the command will be recorded because the MSO does not make or maintain a complete copy of the program. In some version of the system 100, a user is unable to watch a recorded program until after the recording is complete (i.e., after the telecast of program has been completed). The system 100 may be configured to preclude recording of more than two program streams simultaneously, to minimize (or even eliminate) buffering of the streamed content, and to place restrictions on the amount of storage provided to each STB.

Alternative embodiments may modify or dispense with these restrictions, of course, so long as care is taken with respect to copyright compliance. For example, because the user's tuners are "virtual," there is no technological limitation on the number of simultaneous program streams that can be recorded by a user. Similarly, a single stored copy of a given program item may be streamed to different users upon their individual requests (instead of storing a separate copy for each user), or back-up or redundancy copies may be made to protect against the risk of loss in the event of system error. Alternative embodiments may use larger buffers for transmission convenience, and/or employ a rolling buffer so that the user can direct recording of content from a point earlier than when she actually sends the command to record. A rolling buffer also facilitates pausing of live TV.

In preferred embodiments, programming or viewing preferences that the user has already established with the head-end server (e.g., parental controls, audio options, global preferences, etc.) are applied to recording and playback. Thus, if parental controls have been applied to a particular STB, those controls will govern what programs can be recorded by a user through that STB and, hence, stored in the storage space associated therewith. It should also be stressed separate storage space may be allocated to each STB associated with a particular account (e.g., a household), and that restrictions and preferences associated with each STB may be applied only to recording and playback by that STB. For example, a single account may have parental controls applied to the STB associated with a child's television, while the STB in the parents' bedroom may have no restrictions.

Figure 2:
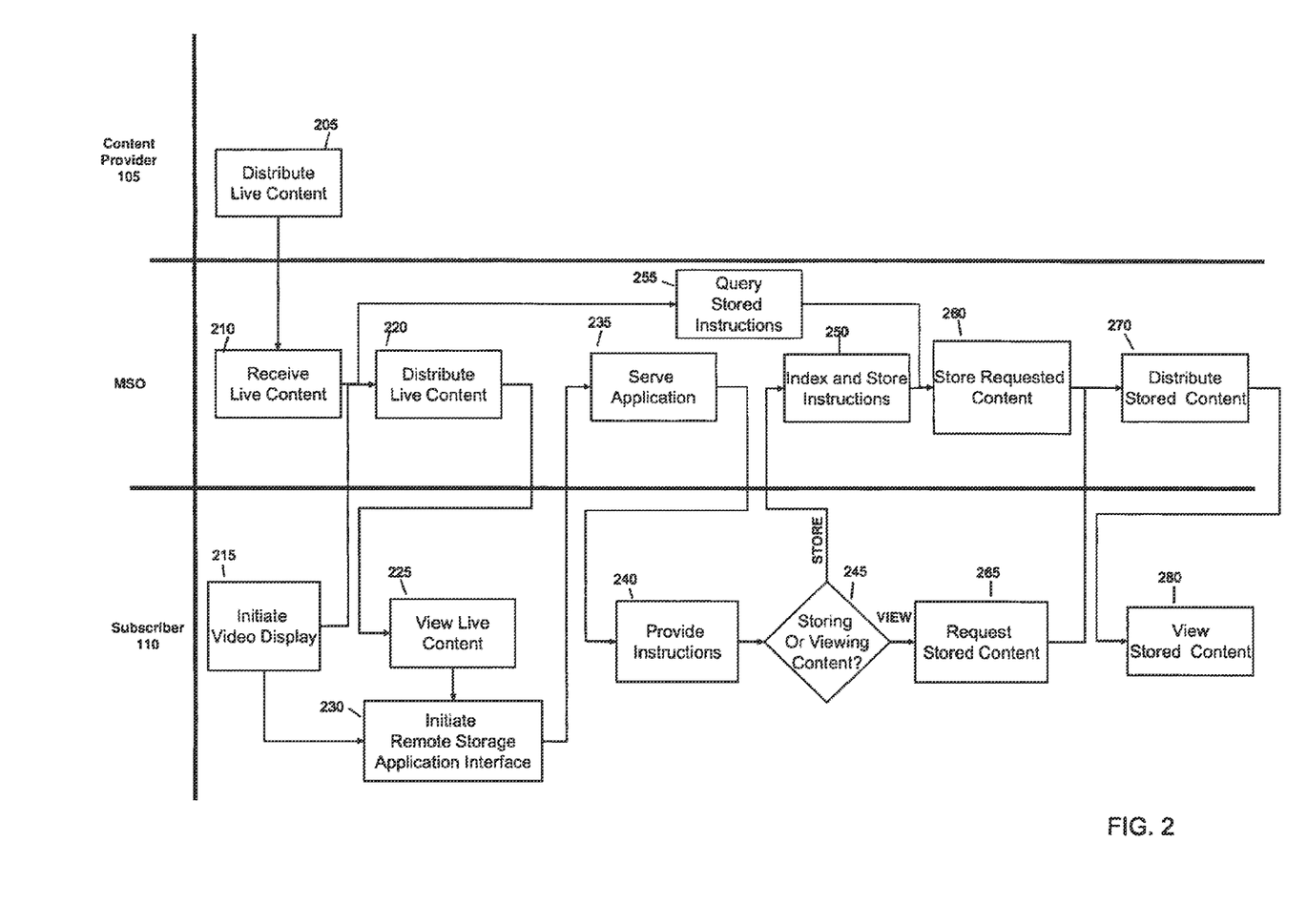
FIG. 2 is a flow chart illustrating the participants and steps involved in using the media content storage system of FIG. 1 according to an embodiment of the invention.

FIG. 2 illustrates an exemplary method for providing centrally-stored content to MSO subscribers. Live content (e.g., linear telecast television signals) is distributed (STEP 205) by content providers 105 to the MSO. Once received (STEP 210), the numerous content feeds are typically aggregated into one aggregated program stream and transported in Multi-Protocol Transport Services (MPTS) protocol format throughout the MSO environment and, using radio-frequency, ip-based protocols as well as other transmission techniques, on to the subscribers 110. In parallel, subscribers 110 initiate video displays (STEP 215) through the use of a STB or personal computer at their homes or businesses or using a wireless or satellite-enabled mobile device in order to view the live content. The MSO distributes the live content (STEP 220) as requested by the subscriber 110, who in turn views the live content (STEP 225). These steps describe, at a high level, the general distribution of cable television services as conventionally implemented.

Recently, however, MSOs have provided additional "interactive" features such as video-on-demand (VOD), DVR capabilities, and e-commerce applications along with the conventional transmission and redistribution servers. For example, if the subscriber 110 wishes to save certain content (either as it is being telecast or at some future date and time) he initiates a subscriber interface application (STEP 230). In some instances, the program commands and instructions that facilitate the execution of the subscriber interface application are provided on the STB, whereas in other cases the functionality is provided at the head-end, typically on one or more servers. In the example provided, the application resides at the MSO, and is served to the subscriber upon receipt of a command to do so (STEP 235), typically the selection of a button on a remote control or an icon presented on the television screen.

The subscriber may then provide instructions (STEP 240) via the STB (or other "client" as described above) by navigating an on-screen menu with a remote control (e.g., pressing the "record" button or scheduling the recording of a program in advance of its telecast). The STB automatically relays the instructions to the head-end over the network. In some instances, the subscriber 110 may want to record upcoming shows (or shows currently being telecast), whereas in other cases he may wish to view previously stored content (STEP 245). If the instructions are to record content, the application module 210 receives the instructions and, if multiple instructions to store the same content were received from more than one subscriber, aggregates and stores the instructions as a single command (STEP 250) for subsequent execution. When the content is telecast, the transaction server queries the stored commands (STEP 255) and provides the aggregated command to the primary and secondary content servers, which cause the content to be recorded (STEP 260) on the subscriber-specific storage devices (or device partitions allocated to subscribers).

If the subscriber wishes to view previously-stored content (i.e., he is not providing instructions to record and store additional content, but merely wants to access existing content from the storage device allocated to him), he may initiate a command to view the stored content via the application interface (STEP 265). In response, the transmission server recalls the stored content from the subscriber's dedicated storage device and distributes the content (STEP 270) accordingly. The subscriber may then view the content (STEP 280).

In some alternative embodiments, the subscriber may provide additional instructions via the application interface to alter the playback of the content using one or more "trick-modes" such as rewinding, fast-forwarding or pausing the content as it is played back. Conventionally, a complete copy of the content is stored on a local DVR, and trick-play telecasts merely require streaming the local copy from the hard drive of the DVR to the display device accordingly. However, providing remote storage capabilities (e.g., located at the head-end of a cable system) presents unique copyright compliance issues. Whereas the locally-stored copy residing on a subscriber's VCR or DVR has been deemed "fair use," a it has yet to be settled whether a copy stored at an MSO facility falls within this principle.

As a result, the invention facilitates trick-play functionality in a manner that minimizes the amount of content stored at the direction of the MSO and places most if not all control over the stored copies in the hands of the user. More specifically, content data packets are placed in a buffer only in response to user commands to implement trick play modes and at no time is this buffering done in the absence of such a customer command. Furthermore, only small portions of programming (e.g., fewer than 5 frames, less than 0.1 second of playback time, or less than 0.05% of the overall content for a ½ hour program) are buffered in order to provide this functionality. The data in the buffers may be deleted very shortly after being placed in the buffer (e.g., within one second) to avoid persistence of any data in the buffers. Operating in this manner, the invention enables the trick-play functions currently provided by local DVRs, but without requiring equipment at each subscriber location. Further, by significantly limiting (or in some cases eliminating) the control over the content exercised by the MSO and avoiding the creation of additional copies of the content, the technique respects copyright restrictions.

Figure 3:
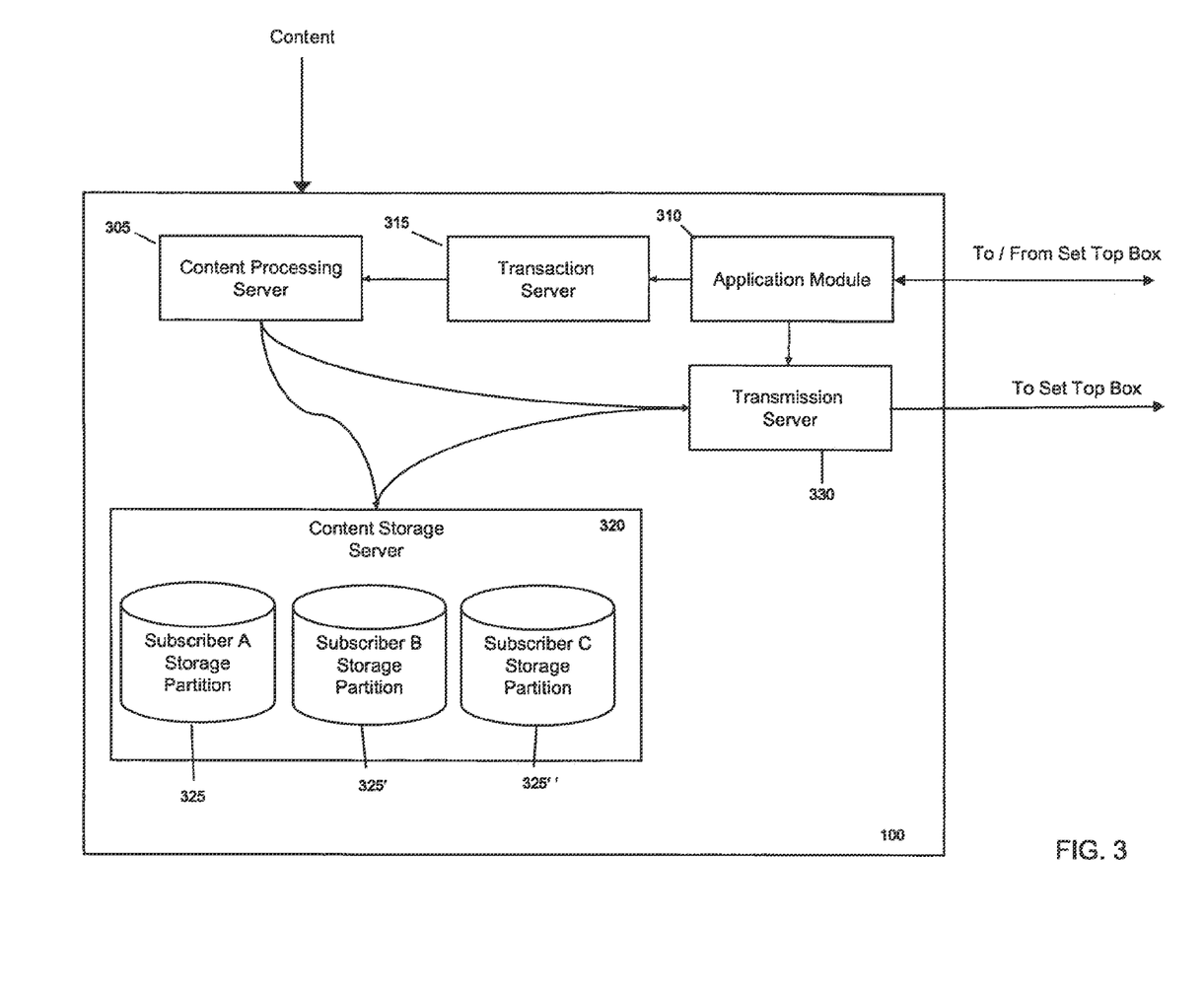
FIG. 3 is a more detailed block diagram of remote storage system of FIG. 1 according to an embodiment of the invention.

Referring now to FIG. 3, the content storage and distribution system 100 includes a content processing server 305 for ingesting content as received from content providers and for processing recording and playback commands, and an application module 310 for providing the application interface to and for receiving recording and playback instructions from the subscribers. A transaction server 315 creates the recording and playback commands as a result of the instructions received from the application module 310, and provides the commands to the content-processing server 305. The content-processing server 305 also provides multiple copies of the content to a content-storage server 320, which includes multiple content-storage areas (or, in some embodiments physical partitions) 320, 320' and 320", each allocated to individual subscribers (or to a collection of subscribers using a common STB, such as the members of a household).

The server components of the system interact with the STBs and other servers, and is preferably implemented on one or more server-class computers that have sufficient memory, data storage, and processing power and that run a server-class operating system (e.g. SUN Solaris, GNU/Linux, MICROSOFT WINDOWS NT). Other types of system hardware and software may also be used, depending on the capacity of the device and the number of users and the size of the user base. For example, the servers may be part of a server farm or server network, which is a logical group of one or more servers. As another example, there may be multiple servers that may be associated or connected with each other, or multiple servers may operate independently, but with shared data. In a further embodiment and as is typical in large-scale systems, application software may be implemented in components, with different components running on different server computers, on the same server, or some combination.

Together, these applications and subsystems provide four different logical functions: content delivery, processing of subscriber commands, content capture, and content transmission and playback, each of which is described in greater detail below.

Content Delivery

In order to make programming available for the system described herein, the aggregate programming stream containing all of the programming received from the content providers is split and one of the streams containing all of the linear network feeds is delivered to the content-processing server 305 for ingestion. The individual program streams contained in the aggregate programming stream may be transmitted in variable bit-rate format (VBR) whereas others may be transmitted in constant bit-rate format (CBR). In certain implementations, the content-processing server 305 only ingests program streams delivered in CBR (e.g., at a CBR of 3.75 MBits/sec, although the rate may change in other embodiments). In such cases, individual program streams transmitted using VBR are fed through a clamper that converts the streams to CBR. In some embodiments, the clamper includes a data buffer of limited size that facilitates storage of a very small amount of content as it is streamed into the content-processing server 305 and awaits commands from users to record the content. Other embodiments may enable ingestion of individual program streams in VBR, in which case the clamper may not be necessary.

Processing Command Requests

The application module 310 manages the user's recording and playback instructions. The application module 310 (working in conjunction and through communication with publishing and control servers, not shown) verifies that (a) the STB is authorized to receive the programming in question, (b) the STB has not already requested that the programming in question be recorded, (c) there is available room on the dedicated storage space to store the allocated to the STB programming in question, and (d) in cases where simultaneous recording of multiple programming is not permitted, the recording will not result in the recording of more than two programs simultaneously. If the aforementioned criteria are not satisfied, an error message is relayed to the STB for display on a display device, directing the user to take remedial steps. In some instances, the application module 310 recognizes video-on-demand programming and will not process a command by a client to record it.

If the STB is verified, the application module 310 determines whether the particular program the user wants to record has been assigned an "asset ID," i.e., a alpha-numeric code that uniquely identifies a particular program being telecast on a particular network at a particular time. If not, a program is assigned an asset ID the first time a user has commanded its recording on the system described herein. For example, if the same episode of "Grey's Anatomy" is telecast on Thursday night at 9 PM and on Friday night at 8 PM, each telecast is assigned a separate asset ID and is treated by the present system as a separate asset, even though the Friday telecast is a re-run. Moreover, if a user records only a portion of a program—for example if the user presses record one minute after a particular episode of "Desperate Housewives" has begun—that recording, because it is a unique recording of something less than the entire episode, is assigned a separate asset ID.

If it is the first time a user has commanded the recording of this particular program, the application module 310 communicates the instructions to the transaction server 315 via an application interface and the transaction server 315 creates an asset ID for the program, using scheduling information sent from a media service bureau and channel and time information regarding the program to be recorded. The asset ID is stored in the transaction server 315, and may be re-used if other users subsequently request recording of the same program. The transaction server 315 may then aggregate the common instructions (e.g., all instructions to record the same program) into a single command, which is processed by the content-processing server 305 in a manner that identifies each of the particular STBs through which the command was issued and the program to be recorded.

In some embodiments, the transaction server 315 also communicates a household identifier that identifies the household to which the particular STB belongs in order to enable certain functionality. For example, the household ID may be used to ensure that all STBs in the household can access the recording. The transaction server 315 aggregates all the recording commands for a particular program and, when the time of the program's telecast arrives, the transaction server 315 sends one message to the content-processing server 305 indicating which and how many users have commanded its recording.

In general, the application module 310 only processes the initial command to record a specific program. For subsequent record requests for the same program, the transaction server 315 formulates (or reformulates) the message concerning this subsequent record command to the content-processing server 305 to include additional information relating to the additional user-initiated commands. In some embodiments, no programming is recorded unless a subscriber issues a specific command to record the programming, and no programming is stored on a hard drive in the secondary content server 320 unless it has been recorded by a subscriber.

In some embodiments, multiple copies of the functional programming instructions that make up the application module 315 may be allocated to individual STBs, users, or combinations thereof. In such cases, the copies may persist regardless of whether the user is providing recording or playback commands, or, in alternative embodiments, an instance of the application may be crated in response to receiving an initial command from the user. Application agents (e.g., software components) may be placed throughout the network to intercept and/or identify user-initiated commands and perform some or all of the functions of the application module 315, or in some cases, direct the application module 315 to copy some or all of the functional components into a user-specific memory space. For example, the user-specific application code may, in some cases, reside on the same physical storage device (and in some cases the same partition) as the user's dedicated storage, whereas in other cases it may reside elsewhere. In either case, creating user-specific instances of the application code provides additional evidence that any copies are being made at the explicit instruction of the user, and not in response to commands created by the MSO.

Content Capture

The content-processing server 305 responds to the messages received from the transaction server 315 and creates a duplicate content stream for each user having commanded the recording of the program. The content-processing server 305 determines the content-storage server 320 (if more than one) and the content storage area 325 (if specifically identified) to which each content stream is to be allocated. The content-storage server 320 then copies program onto the dedicated storage space(s) 325 of each user who has commanded its recording. Once the recording is completed, the content-processing server 305 sends a message to the transaction server 315 that the recording has been made. In the event of an error in the recording process, an error message is relayed to the transaction server 315 and in some cases to the application module 310 for transmission to the user. If the capture was successful, the transaction server 315 thereupon communicates an "ingestion completed" message to the application module 310, which communicates it to the client. The recorded program is then included on the client's recording programming list, which is accessible through the user-interface menu system.

In one implementation, each secondary server 320 contains (or has direct write access to) a series of 400-gigabyte hard drives. Each authorized user (or STB) is assigned up to a maximum storage allotment (e.g., 160 gigabytes of storage space) on one hard drive. In some instances, each hard drive is virtually partitioned into user-specific partitions. In some implementations, no user is allocated storage space on more than one hard drive, and multiple (e.g., up to four) users may share space on one hard drive. Every recording made through a particular STB is stored in the storage space assigned to that STB (or the user associated with the STB), and only that user can access the recordings stored in its allocated storage space.

In deference to copyright restrictions that limit the method of copying programming, multiple users issuing a record command for the same program generate separate copies of the program for each user who issued the record command, with each copy located in each user's storage space. For example, if 1000 users elect to record the February 25th 9 PM showing of "Desperate Housewives," 1000 real-time copies of that specific showing are written to 1000 separate storage spaces. In this implementation, no redundant or back-up copies of programs recorded by users are made. Consequently, if the system malfunctions or if the disk drive on which the client's dedicated storage space is located is damaged, the user loses the affected content.

When the recording-completion message is delivered to the transaction server 315, the application module 310 is notified as well. In response, the application module 310 moves the asset to a "PRODUCTION" state indicating its availability as a recordable asset. As part of being set to the "PRODUCTION" state, the asset metadata is saved (in, for example an LDAP directory server, not shown) for access by a transmission server 330 during playback. The LDAP directory server is used to quickly access information about production assets in order to identify the relevant content storage server 320 and the particular hard drive on which they reside. In addition, the asset data provided by the LDAP interface may include encryption access criteria that are typically not available at the STB.

Playback

Once the recording has been captured by the system 110 and notification of the transaction server 315 and application module 310 has completed, the asset is available for playback by the STB through which it was recorded.

The application module 310 provides a menu screen that enables a user to access a list of programs that have been recorded by that STB. Each program represents a uniquely captured asset stored on the content storage server 320 dedicated to that STB. The user begins playback by pressing "play" on the remote control. In order to stream the asset, the STB establishes a session with the transmission server 330 on behalf of the client. The transmission server 330 includes an enterprise session resource manager module (eSRM, not shown) that manages individual connections and system resources as dedicated to individual STBs.

In general, the STB connects to the eSRM via internet protocol. The eSRM establishes a session by first forwarding the playback command to the transaction server 315, and then forwarding the playback command message to the storage device selected by the transaction server 315. The transaction server 315 first determines if the asset exists. Then, based on the service group of the client, the content processing server 305 identifies the content storage server 320 and specific storage partition 325 on which the asset is located as well as any encryption information needed for the asset (if needed), and communicates this information to the eSRM. The eSRM then informs the content processing server 305 of the asset to be streamed, and the content processing server 305 responds with a request for bandwidth required to stream the asset. The eSRM communicates with a quadrature amplitude modulation (QAM) device to reserve the bandwidth necessary for the streaming of the asset. Once it has all the information necessary to establish the streaming session, the eSRM informs the appropriate content storage server 320 of the resources required to stream this asset. The resource information comprises or consists of the QAM IP address, user datagram protocol (UDM) port number of the QAM and, optionally, an MPEG program number to put in the stream. The eSRM additionally completes the session with the STB, informing the STB of the frequency and program number needed to "tune" to the stream. The asset is then streamed to the STB for viewing on a display device.

Figure 4:
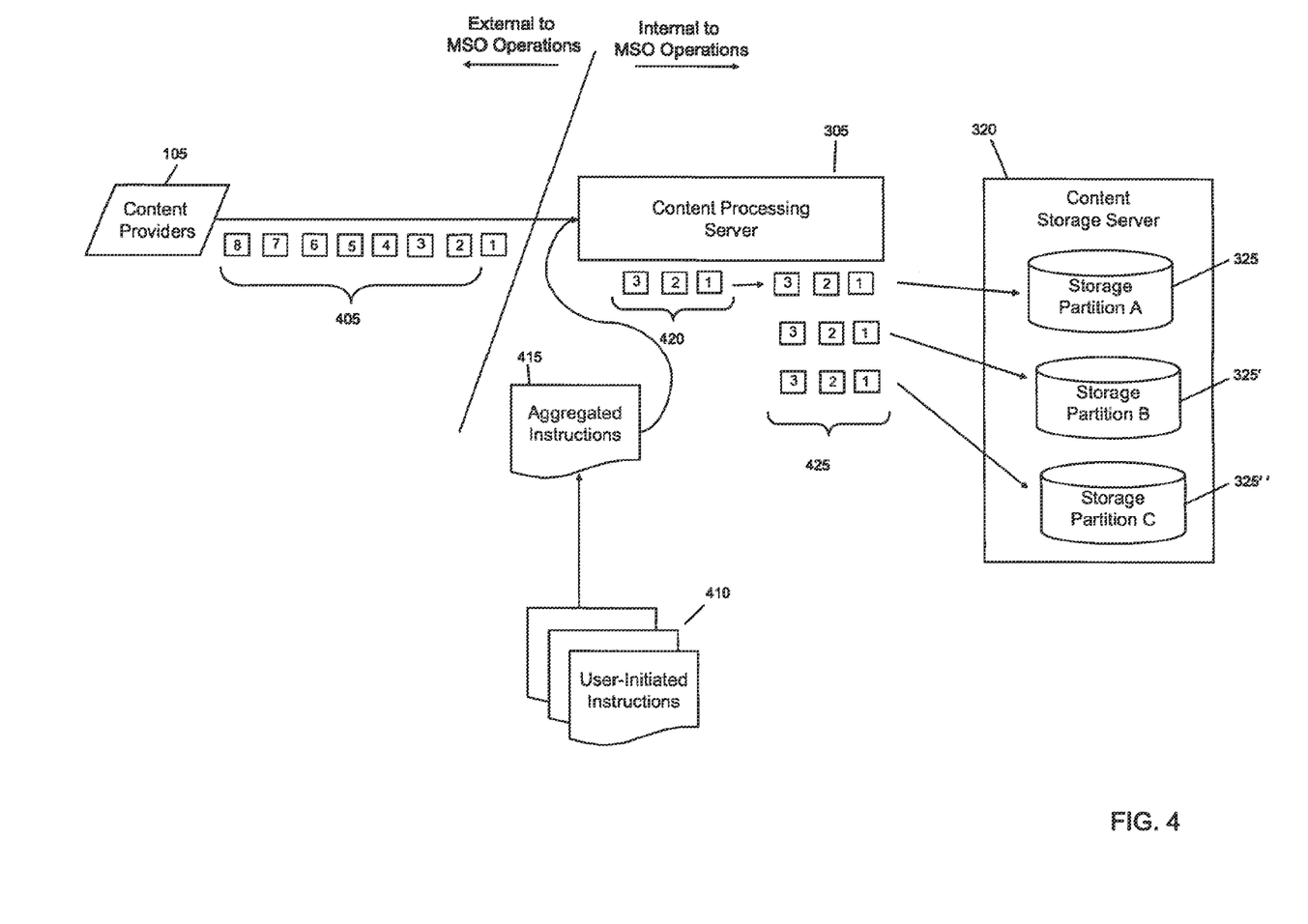
FIG. 4 is a block diagram depicting the receipt and storage of content according to an embodiment of the invention.

FIG. 4 provides a more detailed illustration of the content capture and storage process described above. Content streams 405 are provided from content providers 105 and are ingested by a content storage server 305 within the MSO environment. The streams 405 may be "packet-based" such that individual packets (e.g., packets 1-8) of information can be identified and stored independently of each other and re-assembled into content. User initiated commands 410 are captured and, in this example, aggregated into a single command 415.

For example, if three users indicated that they wanted to record a particular sporting event, three user initiated commands 410 are created—one for each user. Subsequently, these three commands can be combined into one command that includes the identification (e.g., IP address, MAC address, subscriber ID, etc.) of each user issuing such commands and the unique asset ID associated with the content. The aggregated commands 415 are provided to the primary content server which stores a de minimis portion of the stream 405 in a primary buffer 420. Based on the commands, the content-storage server 305 determines the number of secondary buffers 425, 425' and 425" needed to fulfill the users' recording commands, and makes a copy of the portion of the stream for each buffer 425. Each copy is delivered to the content-storage server 320 and stored in the storage area(s) 325 allocated to the user(s) issuing the commands to do so.

In some implementations, the size of the primary buffer and/or the secondary buffer is limited to avoid creating any significant and/or fixed copies of the content prior to being stored on the user-specific 325. In such cases, the number of packets that can be stored at any one time in the buffers may be limited so as to represent a de minimis portion of the overall content. For example, if it is determined that storing no more than 0.05% of any one program is acceptable from a copyright persepective, the upper bound on the number of packets stored at any one time can be limited to a number representing less than one second of a thirty minute program (30 minutes×60 seconds/minute×0.05%=0.9 second.) The buffer sizes may remain constant, or in some cases may change with the duration of the program being copied. In some instances, the buffer size may be determined based on a fixed number of frames (e.g., 3).

Figure 5:
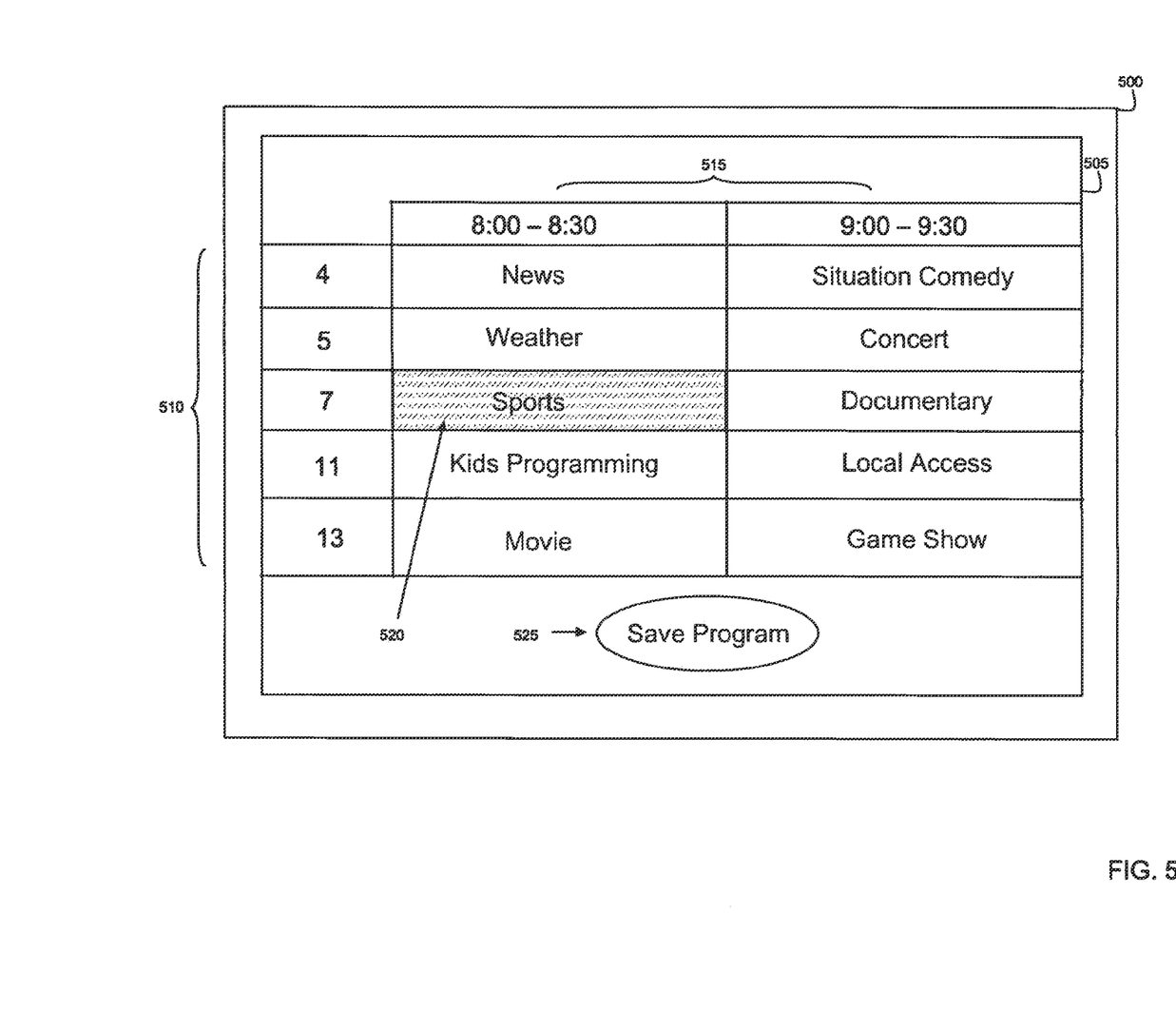
FIG. 5 is an exemplary content guide screen with which users select content to be stored in an embodiment of the invention.
Figure 6:
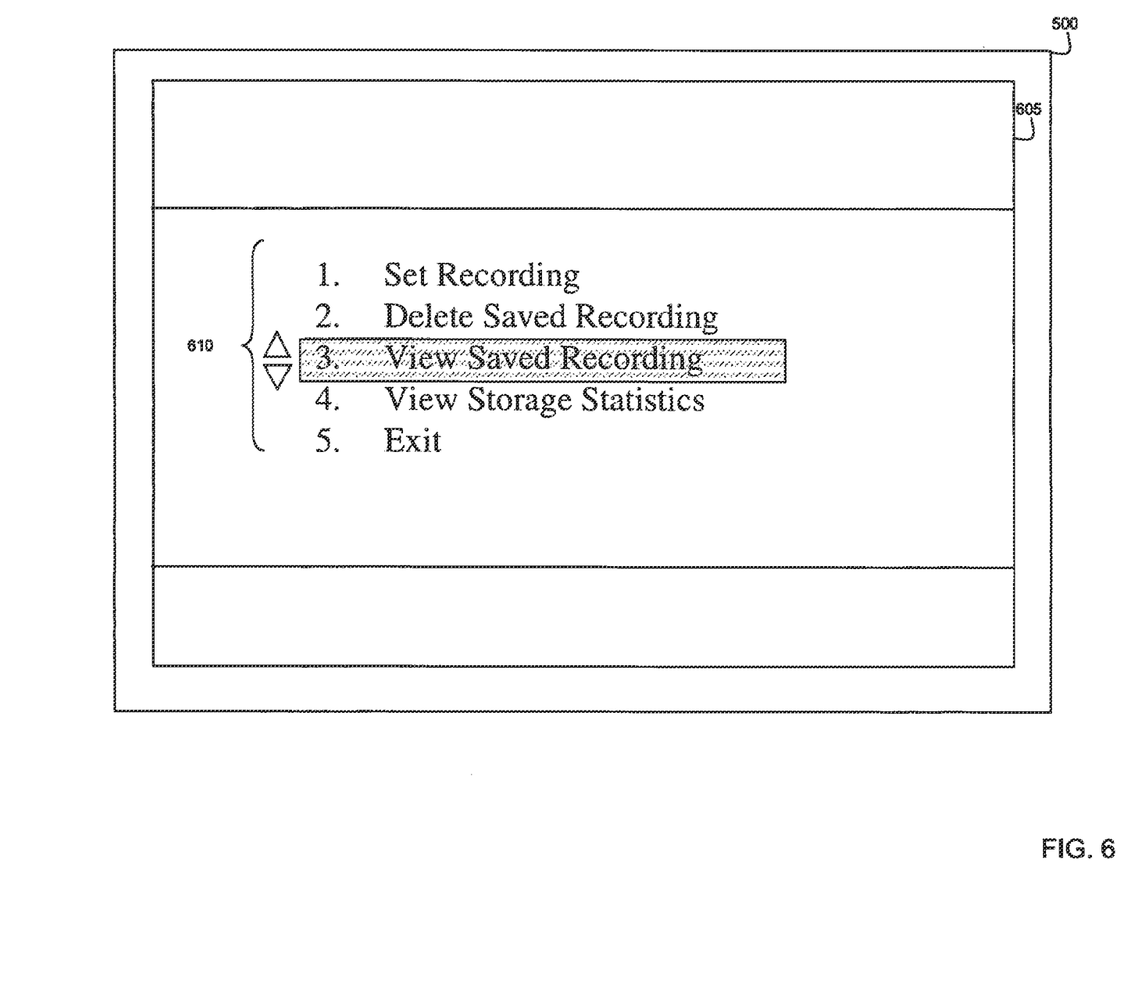
FIG. 6 is an exemplary menu screen with which users select content to be stored, viewed and deleted in an embodiment of the invention.

FIGS. 4 and 5 illustrate example screen captures of a menu-based application that facilitates the display of information and capturing of user commands as described above. A display device 500 (typically a television, but in other instances a computer monitor, PDA screen, WAP-enabled telephone or other mobile device) displays interactive screens that respond to commands entered using a remote control, pointing device (e.g., mouse or stylus), human touch, voice or other means of entering commands. Referring specifically to FIG. 5, a channel line-up screen 505 provides the user with a channel 510 and time-based 515 grid of programs 520 available for recording. The user manipulates the screen to indicate which show he wishes to record, and selects a button or icon 525 which sends the appropriate commands to the head-end servers for processing. FIG. 6 provides an exemplary screen 605 from a menu-based application that enables the user to select various commands 610 for manipulating content, including saving, viewing and deleting content, as well as monitoring storage statistics (e.g., amount of physical space remaining) for her dedicated storage.

In summary, the invention goes beyond conventional methods for storing content on behalf of users by limiting, at each step of the process, the portion of the content stored by the operator, and places the responsibility for managing the stored content squarely on the shoulders of the user. In carrying out the invention, the limited buffering enhancement to a dedicated content storage service enables the user perform operations on telecast programming previously only permitted using personal DVR devices at the user's location. Thus, using the techniques and systems described herein, MSOs can offer DVR-like functionality without needing to provide and maintain thousands of DVR devices while still respecting copyright principles.

What is claimed is:

1. A computer-implemented method of distributing telecast video content to a user, requiring a computer comprising a memory and a processor at a multi-system operator (MSO), wherein the user is operating at least one of an individual set-top box, an individual conditional-access device, a collection of set-top boxes, or a collection of conditional-access devices, the method comprising:
   providing a user interface, to facilitate input and receipt of an initial command and a playback command from the user;
   receiving the initial command to store a desired telecast video content;
   dynamically allocating, by the computer at the MSO, remote storage space dedicated to the user for the desired telecast video content in response to the initial command, wherein the dynamically allocated remote storage space is configured to be under exclusive control of the user and dedicated to the user, and wherein the desired telecast video content is made available only to the user;
   receiving the desired telecast video content in a primary buffer, wherein, at any given time, only a de minimis portion of the desired telecast video content is stored in the primary buffer;
   transferring the desired telecast video content, from the primary buffer to a secondary buffer at the MSO and at a packet level in response to the initial command from the user;
   creating in response to the initial command from the user, and not under direction of the MSO, a copy of the desired telecast video content that is unique to the user by transferring the desired telecast video content from the secondary buffer to the dynamically allocated remote storage space that is under the exclusive control of the user and is dedicated to the user, and wherein in accordance with copyright laws the MSO does not create a back-up copy of the copy of the desired televised video content;
   providing, via the user interface, a menu of stored programs that include the copy of the desired telecast video content that is unique to the user and under the exclusive control of the user in the dynamically allocated remote storage space;
   receiving, via the user interface, the playback command to transmit the copy of the desired telecast video content from the dynamically allocated remote storage space; and
   transmitting only to the user, in response to the playback command, the copy of the desired telecast video content from the dynamically allocated remote storage space for display.

2. The computer-implemented method of claim 1, wherein dynamically allocating remote storage space to the user comprises:
   determining whether the user is authorized to receive the desired telecast video content;
   determining whether the initial command has been received from the user; and
   determining whether an allocated storage quota for the user has been met.

3. The computer-implemented method of claim 1, wherein dynamically allocating remote storage space to the user comprises:
   associating a user identifier with the user and a content identifier with the desired telecast video content; and
   creating a unique command to store the desired telecast video content based on the user identifier and content identifier.

4. The computer-implemented method of claim 3, wherein transmitting to the user the copy of the desired telecast video content from the dynamically allocated remote storage space in response to the playback command further comprises:
   transmitting the copy of the desired telecast video content associated with the content identifier only to the user associated with the user identifier.

5. The computer-implemented method of claim 1, wherein dynamically allocating remote storage space includes allocating, by the computer, a storage quota to the user.

6. The computer-implemented method of claim 1, further comprising:
   receiving a third command from the user to alter playback of the copy of the desired telecast video content;
   in response to the third command, creating a third buffer to facilitate the altered playback, wherein the altered playback comprises one of fast forwarding the copy of the desired telecast video content, rewinding the copy of the desired telecast video content, and pausing the copy of the desired telecast content; and deleting contents of the third buffer upon completing the altered playback in response to the third command.

7. The computer-implemented method of claim 1, further comprising preventing other users from receiving the copy of the desired telecast video content that has been stored in the dynamically allocated remote storage space.

8. The computer-implemented method of claim 1, further comprising enabling the user to select discrete portions of the desired telecast video content for storage.

9. The computer-implemented method of claim 1, wherein transferring the desired telecast video content from the primary buffer to the secondary buffer and transferring the desired telecast video content from the secondary buffer to the dynamically allocated remote storage space includes simultaneously transferring a plurality of requested telecast video content to associated dynamically allocated remote storage space.

10. The computer-implemented method of claim 1, wherein the de minimis portion of the desired telecast video content stored in the primary buffer comprises no more than 0.05% of a play time of the desired telecast video content.

11. The computer-implemented method of claim 1, wherein the de minimis portion of the telecast video content stored in the primary buffer comprises no more than 0.1 second of a play time of the desired telecast video content.

12. The computer-implemented method of claim 1, wherein the de minimis portion of the desired telecast video content is stored in the primary buffer for about one second.

13. The computer-implemented method of claim 1, further comprising:
  receiving a trick-play command from the user to alter playback of the copy of the desired telecast video content; and
  transferring the copy of the desired telecast video content to a third buffer created in response to receiving the trick-play command.

14. A multi-system operator (MSO) media distribution system for storing media content, comprising:
  a memory located at the MSO media distribution system and remotely from a user of the MSO media distribution system;
  a primary buffer, at the MSO media distribution system, configured to receive media content transmitted from the memory by a content provider and for storing at any given time only a de minimis portion of the media content;
  a secondary buffer, at the MSO media distribution system, configured to temporarily store the received media content from the primary buffer prior to storage in a segment of the memory that is allocated exclusively to the user and is under exclusive control of the user; and
  a processor, at the MSO, programmable to:
    receive an initial command corresponding to a desired media content from the user;
    in response to the initial command from the user, and not from the MSO, create a copy of the desired media content that is unique to the user and is under the exclusive control of the user by transferring and storing the desired media content from the primary buffer via the secondary buffer into the segment of the memory that is allocated exclusively to the user and is under the exclusive control of the user, wherein in accordance with copyright laws the processor does not create a back-up copy of the copy of the desired media content for the user; and
    in response to a playback command from the user, distribute the copy of the desired media content to the user from the segment of the memory that is allocated exclusively to the user and is under the exclusive control of the user.

15. The system of claim 14, wherein the processor is further programmable to associate a user identifier with the user and a content identifier with the desired media content, and to create a unique command from the initial command based on the user identifier and the content identifier.

16. The system of claim 14, wherein the user is a set-top box and the processor is further programmable to receive the initial command and the playback command from the set-top box.

17. The system of claim 14, wherein the user is a collection of set-top boxes located in an individual household and the processor is further programmable to receive the initial command and the playback command from the collection of set-top boxes.

18. The system of claim 14, wherein the processor is further programmable to associates a unique user identifier with a predetermined group of users or set-top boxes and receives the initial command and the playback command from the predetermined group of users or set-top boxes.

19. The system of claim 14, wherein the user is a conditional-access device, and the initial command and the playback command are received from the same conditional-access device, or from a device comprising the conditional-access device.

20. The system of claim 14, wherein the primary buffer is further configured to transfer the media content to the secondary buffer at a packet level.

21. The system of claim 14, wherein the de minimis portion of the media content stored in the primary buffer comprises no more than 0.05% of a play time of the media content.

22. The system of claim 14, wherein the de minimis portion of the media content stored in the primary buffer comprises no more than 0.1 second of a play time of the media content.

23. The system of claim 14, further comprising application code provided to the user, wherein the application code causes, upon execution, receipt of the initial command and creation of a unique command to store the desired media content on behalf of the user.

24. The system of claim 14, wherein the processor is programmable to receive an initial command from a plurality of users, create a unique command based on each of the received initial commands, and aggregate the unique commands into a single command.

25. The system of claim 24, wherein the processor is programmable to allocate to each of the plurality of users a respective storage quota and dynamically allocate storage space to each of the plurality of users based on the respective user's storage quota in response to the initial command issued by the respective user.

26. The system of claim 24, wherein each of the plurality of users is a set-top box in a cable television system.

27. The system of claim 26, wherein the processor is programmable to associate a viewing preference with each user.

28. The system of claim 27, wherein the processor is programmable to transmit the copy of the desired media content to the user only in accordance with a viewing preference of the user, the viewing preference comprising a parental control.

29. The system of claim 24, wherein each user comprises a collection of set-top boxes, and wherein each collection of the set-top boxes is located in a different household or building.

30. The system of claim 24, wherein each user comprises a predetermined group of set-top boxes.

31. The system of claim 24, wherein each user comprises a conditional-access device or a predetermined group of conditional-access devices.

32. The system of claim 24, wherein the processor is programmable to receive a third command from the user to alter playback of the copy of the desired media content, and in response to the third command, utilize a third buffer to facilitate the altered playback.

33. The system of claim 32, wherein the altered playback comprises one of fast forwarding stored content, rewinding the stored content, and pausing the stored content.

34. The system of claim 24, wherein the memory is located at a central facility of a cable television distribution system of the MSO.

35. A multi-system operator (MSO) media distribution system comprising:
- a first server, at the MSO media distribution system, configured to receive media from a content provider;
- a first buffer, at the MSO media distribution system, coupled to the first server, configured to receive the media and store at any given time only a de minimis percentage of the media;
- a second server including a plurality of storage areas;
- a plurality of second buffers, coupled to the first buffer and the second server, configured to temporarily store the media from the first buffer prior to storage in a storage area of the plurality of storage areas in the second server that is allocated exclusively to the user and is under exclusive control of the user;
- wherein the second server is configured to receive a first command from the user, and not from the MSO, to store a copy of the media that is unique to the user into the storage area that is allocated to the user and is under the exclusive control of the user by transferring the media from the primary buffer via one or more of the plurality of second buffers into the storage area that is allocated to the user and is under the exclusive control of the user, wherein in accordance with copyright laws the second server does not create a back-up copy of the copy of the media for the user; and
- a third server, coupled to the second server, configured to only distribute the copy of the media from the second server to the user that issued the first command, in response to a second command from the user.

* * * * *